US010447576B2

(12) United States Patent
Zhang et al.

(10) Patent No.: US 10,447,576 B2
(45) Date of Patent: Oct. 15, 2019

(54) OPTIMIZATION OF MTC DEVICE TRIGGER DELIVERY

(71) Applicant: NEC Corporation, Tokyo (JP)

(72) Inventors: Xiaowei Zhang, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/360,138

(22) Filed: Nov. 23, 2016

(65) Prior Publication Data

US 2017/0078832 A1    Mar. 16, 2017

Related U.S. Application Data

(63) Continuation of application No. 14/409,968, filed as application No. PCT/JP2013/002757 on Apr. 23, 2013.

(30) Foreign Application Priority Data

Jun. 29, 2012  (JP) .................................. 2012-147982
Sep. 24, 2012  (JP) .................................. 2012-209393

(51) Int. Cl.
H04L 12/729       (2013.01)
H04W 28/02        (2009.01)
(Continued)

(52) U.S. Cl.
CPC ............. *H04L 45/125* (2013.01); *H04W 4/70* (2018.02); *H04W 28/0289* (2013.01);
(Continued)

(58) Field of Classification Search
None
See application file for complete search history.

(56) References Cited

U.S. PATENT DOCUMENTS 7,106,698 B1   9/2006 Basso et al.
8,125,892 B1   2/2012 Jokimies et al.
(Continued)

FOREIGN PATENT DOCUMENTS

CN   102404825 A   4/2012
CN   102457839 A   5/2012
(Continued)

OTHER PUBLICATIONS

Chinese Office Action issued by the State Intellectual Property Office of the People's Republic of China for Chinese Application No. 201380034378.7 dated Aug. 2, 2017 (17 pages)
(Continued)

Primary Examiner — James P Duffy
(74) Attorney, Agent, or Firm — Wilmer Cutler Pickering Hale and Dorr LLP

(57) ABSTRACT

A network node (21), which is placed within a core network, stores a list of network elements (24) capable of forwarding a trigger message to a MTC device (10). The network node (21) receives the trigger message from a transmission source (30, 40) placed outside the core network, and then selects, based on the list, one of the network elements to forward the trigger message to the MTC device (10). The MTC device (10) validates the received trigger message, and then transmits, when the trigger message is not validated, to the network node (21) a reject message indicating that the trigger message is not accepted by the MTC device (10). Upon receiving the reject message, the network node (21) forwards the trigger message through a different one of the network elements, or forwards the reject message to transmission source (30, 40) to send the trigger message through user plane.

19 Claims, 5 Drawing Sheets

(51) Int. Cl.
  *H04W 40/02* (2009.01)
  *H04W 52/02* (2009.01)
  *H04W 4/70* (2018.01)
  *H04W 88/16* (2009.01)

(52) U.S. Cl.
  CPC ....... *H04W 40/02* (2013.01); *H04W 52/0209* (2013.01); *H04W 88/16* (2013.01); *Y02D 70/1224* (2018.01); *Y02D 70/1262* (2018.01); *Y02D 70/1264* (2018.01); *Y02D 70/21* (2018.01)

(56) References Cited

U.S. PATENT DOCUMENTS

| | | | |
|---|---|---|---|
| 2008/0112395 A1* | 5/2008 | Zhu | H04Q 3/0029 370/352 |
| 2012/0257571 A1* | 10/2012 | Liao | H04W 4/005 370/328 |
| 2013/0115982 A1* | 5/2013 | Stojanovski | H04L 12/5875 455/466 |
| 2013/0163520 A1 | 6/2013 | Kimura | |
| 2013/0279372 A1* | 10/2013 | Jain | H04W 4/06 370/254 |
| 2013/0308564 A1* | 11/2013 | Jain | H04B 15/00 370/329 |
| 2014/0307632 A1* | 10/2014 | Kim | H04W 4/005 370/328 |

FOREIGN PATENT DOCUMENTS

| | | |
|---|---|---|
| EP | 2627123 A | 8/2013 |
| JP | 2005-203926 A | 7/2005 |
| JP | 2009-130657 A | 6/2009 |
| JP | 2012-080413 A | 4/2012 |
| WO | WO-2011/11608 A1 | 9/2011 |
| WO | WO-2012/046503 A1 | 4/2012 |

OTHER PUBLICATIONS

3GPP TR 23.888, "Technical Specification Group Services and System Aspects; System Improvements for Machine-Type Communications; (Release 11)", v1.6.1, Feb. 2012, 165 pages.
3GPP TR 33.868, "Security aspects of Machine-Type Communications; (Release 11)", v0.8.0, May 2012, 48 pages.
3GPP TS 23.682, "Architecture Enhancements to faciitate communications with packet data networks and applications (Release 11)", v11.1.0, Jun. 2012, 27 pages.
3GPP TS 24.301, "Non-Access-Stratum (NAS) protocol for Evolved Packet System (EPS); Stage 3 (Release 11)", v11.2.1, Mar. 2012, 327 pages.
International Search Report, corresponding to PCT JP2013/002757, dated Oct. 24, 2013, 7 pages.
Japanese Notification of Reasons for Refusal corresponding to Japanese Application No. 2014-558698, dated Dec. 8, 2015, 7 pages.
Japanese Office Action issued by the Japan Patent Office for Application No. 2014-558698 dated Jul. 26, 2016 (5 pages).
Sierra Wireless: "Solution for MTC Device Trigger indication from MTC Server", 3GPP Draft; S2-111038_00295_DEVICE_TRIGGER_SOLUTION, 3RD Generation Partnership Project (3GPP), Mobile Competence Centre; 650, Route Des Lucioles; F06921 Sophia-Antipolis Cedex; France, vol. SA WG2, No. Salt Lake City; 20110221, Feb. 26, 20114 (Feb. 26, 2011), XP050524100, 4 pages.

* cited by examiner

OPTIMIZATION OF MTC DEVICE TRIGGER DELIVERY

CROSS REFERENCE TO RELATED APPLICATIONS

The present application is a continuation of U.S. patent application Ser. No. 14/409,968 entitled "Optimizaton of MTC Device Trigger Delivery," filed on Dec. 19, 2014, which is a national stage application of International Application No. PCT/JP2013/002757, filed on Apr. 23, 2013, which claims the benefit of priority from Japanese Patent Application No. JP2012-209393, filed on Sep. 24, 2012, and Japanese Patent Application No. 2012-147982, filed on Jun. 29, 2012, the disclosures of each of which are hereby incorporated by reference in their entirety.

TECHNICAL FIELD

The present invention relates to new functions for UE (User Equipment)/MTC (Machine-Type-Communication) device and MTC-IWF (MTC-Interworking Function), in order to provide an efficient mechanism for MTC device trigger delivery.

BACKGROUND ART

MTC device triggering is a feature defined by the 3GPP's (Third Generation Partnership Project's) LTE-A (Long Term Evolution-Advanced) (see e.g. NPL 1). The MTC device triggering is sent from SCS (Services Capability Server) or SME (Short Message Entities) to network and terminated at MTC device. MTC device triggering message can be sent in NAS (Non-Access-Stratum) messages, SMS (Short Message Service), or user plane message.

MTC device trigger may not reach MTC device due to security protection check failure at UE. For example, it is described in NPL 2 that some NAS messages (e.g. Identity Request, Authentication Request, Detach Accept, etc.) with no protection can be processed by UE. If a fake MTC device trigger is embedded in such NAS messages, it can cause MTC device battery consumption, and potential mis-behaviour/mis-configuration of the MTC device.

When the secure exchange of NAS messages has not been established, UE discards the NAS messages which do not pass the integrity check (see e.g. NPL 3). When MTC device trigger is carried in such NAS messages and discarded, SCS will not have knowledge about it and may send the same trigger again. This will cause 1) overloading the network, 2) MTC device battery consumption. Another example is when trigger sent over user plane. The current 3GPP security mechanism requires confidential protection on user plane. Similarly problem should be considered that when the user plane message carrying trigger is not properly protected.

There is also considered an issue for SMS based trigger. In LTE where CSFB (CS (Circuit Switched) Fall Back) is in use, and SMS trigger is sent from SCS, without knowledge about if MTC device is IMS (IP (Internet Protocol) Multimedia Subsystem) support, MTC-IWF may forward the message to MME (Mobility Management Entity, assuming it is the serving node), then MME will decide what is the correct route. For example, if the UE is not IMS supported, MME will forward the SMS trigger to MSC (Mobile Switching Centre).

CITATION LIST

Non Patent Literature

NPL 1: 3GPP TS 23.682, "Architecture Enhancements to facilitate communications with packet data networks and applications (Release 11)", v11.1.0, 2012-06

NPL 2: 3GPP TS 24.301, "Non-Access-Stratum (NAS) protocol for Evolved Packet System (EPS); Stage 3 (Release 11)", v11.2.1, 2012-03

NPL 3: 3GPP TR 33.868, "Security aspects of Machine-Type Communications; (Release 11)", v0.8.0

SUMMARY OF INVENTION

Technical Problem

Assume that the trigger source (e.g. SCS or SME) is outside of 3GPP network domain. MTC device triggering can be sent in NAS message, user plane message or SMS message. Now, based on the background art given above, the issues to be solved include:

1. Solution for receiving not properly protected message (e.g. NAS message) carrying trigger(s);
2. Reducing network load and MTC device battery consumption; and
3. Decision making on MTC device trigger delivery route by MTC-IWF.

Currently when MTC device receives a trigger without NAS protection or user plane message, it only discards the message.

There is no requirement for MTC-IWF storing MTC device capabilities, MTC device serving node information, and trigger message.

MTC-IWF only forwards the trigger to the serving node but there is no mechanism for an optimization of path selection.

As mentioned above, currently if MTC device does not support IMS, for a network which supports CSFB, MME can forward the SMS trigger to MSC. However, the inventors of this application have found that if MTC-IWF has knowledge in the early stage, a shorter route can be taken that MTC-IWF directly forwards the SMS trigger directly to MSC.

Accordingly, an exemplary object of the present invention is to provide solutions to the above described issues such that MTC device trigger can be delivered efficiently.

Solution to Problem

In order to achieve the above-mentioned object, one exemplary aspect of this invention first considers MTC device triggering carried in unprotected NAS or user plane message. When such messages carry MTC device trigger, MTC device can discard the trigger and send a Trigger Reject message to MTC-IWF or GGSN (Gateway GPRS (General Packet Radio Service) Support Node)/P-GW (PDN (Packet data network) Gateway). MTC-IWF or GGSN/P-GW will hold this trigger message and forward it via a different path like SGSN (Serving GPRS Support Node) in case of NAS message or S-GW (Serving Gateway) in case of user plane message. In case of NAS message, MTC-IWF can alternatively check the security status with MME and SGSN beforehand, and wrap the trigger in NAS message only when MME has valid NAS security context. The route in which the MTC device trigger is delivered, can be decided by a priority list of MTC device trigger delivery. The priority can be decided by UE capabilities and serving node information. The list can be either created in HSS (Home Subscriber Server) or MTC-IWF.

When the SMS trigger is in use and MTC device does not support IMS, without knowledge about MTC device capability, MTC-IWF may still forward the SMS trigger message to MME, if it was indicated that the MME is the current serving node by HSS. When MME finds out MTC device does not support IMS, it will forward the trigger to MSC to make it reach MTC device. This will delay the trigger delivery. While MTC-IWF can access HSS for some of MTC device information, it is proposed that MTC-IWF also requests MTC device capabilities of IMS support or not. When the MTC-IWF receives a SMS trigger, it will check its local stored MTC device capability, if the MTC device does not support IMS, it can directly forward the trigger to MSC.

Advantageous Effects of Invention

According to the present invention, it is possible to solve one or more of the above-described issues. For example, it is possible to achieve at least a part or one of the following effects 1 to 3.

1. The network node (MTC-IWF or GGSN/P-GW) which forwards trigger or trigger source can have knowledge of the trigger discarding. It can find another path to deliver the trigger such that 1) the trigger can reach MTC device, 2) the trigger will not be re-sent on the same path thus unnecessary network traffic can be reduced and MTC device battery consumption will not be wasted.

2. MTC-IWF can decide a right path for MTC device trigger delivery in an early stage so that the trigger delivery time can be shorten and network traffic will not be wasted.

3. A priority list of MTC device trigger delivery path provides a route selection optimization such that MTC-IWF will be able to choose a proper route in an early stage and will not send the trigger through a failed path.

DESCRIPTION OF EMBODIMENTS

Hereinafter, an exemplary embodiment of the present invention will be described with reference to FIGS. 1 to 5.

As mentioned above, when the trigger message is send over NAS, it is described in NPL 3 that trigger without NAS security protection should be discarded by MTC device. The trigger source or network node such as MTC-IWF will not know about the discard and repeatedly send the same trigger again, which may be discarded by the MTC device again. This can cause a few problems: 1) the trigger will not reach MTC device; 2) MTC device (power sensitive) will consume and waste battery; 3) network traffic waste.

Figure 1:
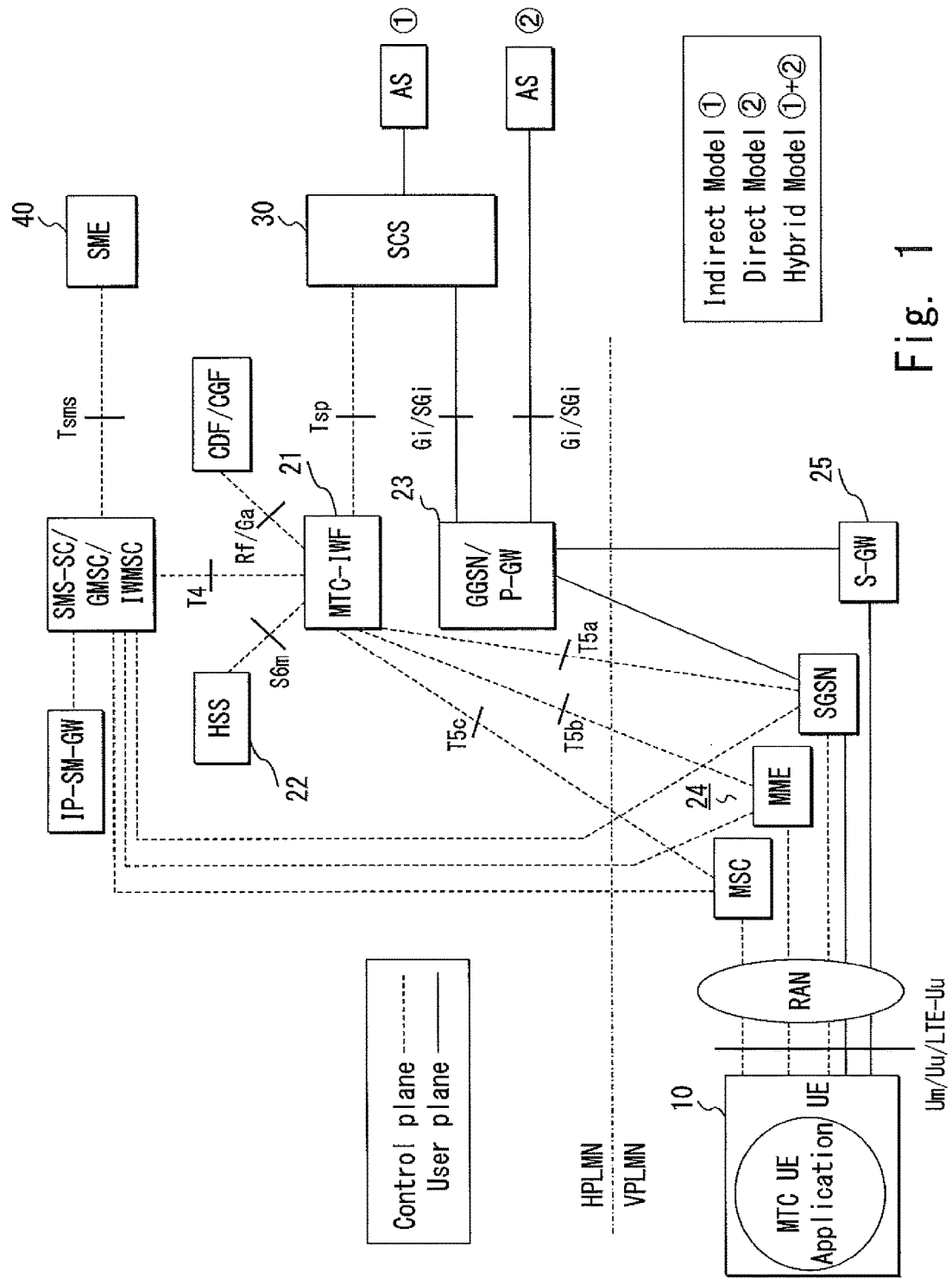
FIG. 1 is a block diagram showing an example of system architecture according to an exemplary embodiment of the present invention.

In order to address these problems, as shown in FIG. 1, a system according to this exemplary embodiment includes a core network (3GPP network), one or more MTC devices 10 which connect to the core network through a RAN (Radio Access Network), and an SCS 30 and an SME 40, each of which is placed outside the core network and serves as a transmission source of a trigger message.

Among them, each MTC device 10 is a UE for MTC communication with the core network via the Um/Uu/LTE-Uu interface. The UE can host one or multiple MTC Applications. The corresponding MTC Applications in the external network are hosted on one or multiple ASs (Application Servers).

Further, the SCS 30 and the SME 40 connect to the core network to communicate with the MTC device 10.

Furthermore, the core network includes an MTC-IWF 21, an HSS 22, and GGSN/P-GW 23 in the HPLMN (Home Public Land Mobile Network), and includes MME/SGSN/MSC 24 and an S-GW 25 in the VPLMN (Visited PLMN). In the core network, each of the MTC-IWF 21 and the GGSN/P-GW 23 serves as a network node which receives a trigger message from its transmission source, each of the MME/SGSN/MSC 24 and the S-GW 25 serves as a network element which forwards the trigger message to the MTC device 10, and the HSS 22 (or e.g. HLR (Home Location Register)) serves as a server which provides various information to the network node. Typically, in a case of NAS message, the MTC-IWF 21 receives a trigger message from the SCS 30 via Tsp interface, and then forwards the trigger message to the MME via T5b interface. On the other hand, in a case of SMS message, the MTC-IWF 21 receives a trigger message from the SME 40 via T4 and Tsms interfaces (i.e. through SMS-SC/GMSC/IWMSC) or from the SCS 30 via Tsp interface, and then forwards the trigger message to the MME/SGSN/MSC 24 via T5b/T5a/T5c interface. Thus, the trigger message can be routed by the MME/SGSN/MSC 24 to the MTC device 10. The HSS 22 stores MTC device capabilities and serving node information which will be described later, and notifies them to the MTC-IWF 21 via S6m interface. The GGSN/P-GW 23 receives a trigger message from the SCS 30 or directly from the AS via Gi/SGi interface, and then forwards the trigger message to the SGSN or the S-GW 25 through user plane, so that the trigger message can be also routed to the MTC device 10.

Next, operation examples of this exemplary embodiment will be described in detail with reference to FIG. 2.

In this exemplary embodiment, assume that the trigger source (i.e. SCS 30 or SME 40) is properly authenticated to the network (Step S1). Mutual authentication between the MTC device 10 and the network is also performed.

(1) Optimization of MTC Device Trigger Delivery

1) MTC-IWF 21 downloads UE capabilities from HSS 22 via interface S6m (Step S2). This can be a new message or the same message that MTC-IWF 21 retrieves UE's serving node information from HSS 22. The UE capabilities can include, for example, information on which communication system (e.g. SAE (System Architecture Evolution)/LTE or 3G) the MTC device 10 supports. Preferably, as will be described in the following (2), the UE capabilities may include information as to whether or not the MTC device 10 supports IMS. On the other hand, the serving node information includes usage rates of the MME/SGSN/MSC 24.

Additionally, routing information can be downloaded from the HSS 22 or the HLR. Data of routing information, serving node information can be pushed or downloaded from HSS/HLR and saved locally in SMSC/SMS-GMSC.

The downloading can happen when:

(A) MTC-IWF 21 receives the first trigger; or (B) MTC device 10 is attached to the network and HSS 22 pushes the information to MTC-IWF 21.

2) MTC-IWF 21 stores the UE capabilities and serving node information locally, for a given period (Step S3).

3) HSS 22 or MTC-IWF 21 creates a priority list of MTC device trigger delivery route, with an expiry timer (Step S4). The priority could be simply a random selection, or decided by operator policy of network usage, or based on the serving node information and UE capabilities. Taking as an example the case where the serving node information includes the usage rates, priority list includes records in which the MME/SGSN/MSC 24 are stored in association with their respective usage rates. Further, in the case where the list is created by the HSS 22, the MTC-IWF 21 downloads the list from the HSS 22. The downloading and/or creation are performed before the MTC-IWF 21 receives the trigger from the SCS 30. Note that the list should be removed if MTC-IWF 21 is informed the MTC device 10 is detached or when it is expired.

4) MTC-IWF 21 receives the trigger from the SCS 30 (Step S5).

5) MTC-IWF 21 performs authorization to SCS 30, to see whether it can send trigger message.

6) MTC-IWF 21 checks security context at a given network element, e.g. MME (Steps S6 and S7), which can be done by:

(A) Pinging given network element for information or by analyzing the information received from the HSS; or (B) Check with the information that provided by HSS 22 when MTC-IWF 21 downloaded the serving node information, or pushed from HSS 22 e.g. when UE changed its location.

7) If MME responds that it has no valid security context for the UE, MTC-IWF 21 will send the trigger message to the next serving node in the priority list, e.g. SGSN (Steps S8 and S9). Then, SGSN forwards the trigger message to MTC device 10 (Step S10). MTC-IWF 21 should ensure that it does not choose the same route, by marking the failed path invalid. Thus, it is possible to prevent the trigger message from being redundantly re-forwarded through the failed path, so that the trigger message can more rapidly reach the MTC device 10. The route can be valid if MTC-IWF 21 receives information from HSS 22 or MME that security context is established.

Thus, in this exemplary embodiment, it is possible to ensure that the trigger message can securely reach the MTC device 10, by deciding the network element which should transfer the trigger message based on the list. In the case where the MTC-IWF 21 creates the list, it is possible to rapidly select the valid path. This is because that the MTC-IWF 21 operates as an entrance into the core network.

Further, in the case where the list includes records in which the MME/SGSN/MSC 24 are stored in association with their respective usage rates, the MTC-IWF 21 can select the MME/SGSN/MSC 24 in ascending order of usage rate. Therefore, it is possible to reduce congestion of the core network.

8) UE (MTC device 10) checks validity of the message carrying the trigger (this follows the current 3GPP specification security requirements) (Step S11).

9) If message is not validated correctly then MTC device 10 discards the trigger message (Step S12) and sends a Reject message to MTC-IWF 21 indicating the reject cause (e.g. no proper security protection) (Step S13), otherwise accepts the trigger.

10) After received the Reject message, MTC-IWF 21 can do as follows:

(A) Choose the next path which is not marked as invalid from propriety list, and then forward the trigger through the chosen path (Step S 14);

(B) When there is no any control plane path available, MTC-IWF 21 can forward the Reject message to SCS 30 such that SCS 30 can send the trigger through user plane (Steps S15 and S16);

(C) Request MME to initiate AKA (Authentication and Key Agreement) and SMC (Short Message Control) procedure to establish security context such that it can forward the trigger message.

Thus, in this exemplary embodiment, it is also possible to prevent the trigger message from being redundantly re-forwarded by use of the Reject message. Therefore, it is possible to reduce congestion of the core network and battery consumption of the MTC device 10. For example, it can be ensured that an emergent trigger message or the like reaches the MTC device 10.

Although the illustration is omitted, with respect to user plane, the GGSN/P-GW 23 performs similar processing with that of the MTC-IWF 21. Specifically, the GGSN/P-GW 23 receives from the MTC device 10 a Reject message with a cause indicating there was no proper user plane confidentiality protection, finds another path to deliver the trigger. For example, if a path via the SGSN is not protected, the GGSN/P-GW 23 chooses a protected path via the S-GW 25 to forward the trigger message.

(2) Consideration of SMS Based Trigger for Non-IMS Support MTC Device

When the trigger message is sent as SMS, MTC devices which do not support IMS should also be considered. An SMS trigger message carried in NAS message to a MTC device which does not support IMS, CSFB may be initiated such that MME will forward the message to MSC. This will cause unnecessary traffic and delay the trigger delivery.

In order to avoid them, the operation of this exemplary embodiment is performed as follows.

1) MTC-IWF 21 can download MTC device capability of support IMS from HSS 22 as described in (1). When an SMS trigger is to be forwarded, MTC-IWF 21 should check the local stored information to see whether MTC device 10 supports IMS or not.

2) If the MTC device 10 does not support IMS, MTC-IWF 21 should forward the trigger directly to MSC, not MME.

In this way, the SMS trigger message is directly forwarded to the MMC not through the MME. Therefore, it is possible to avoid causing unnecessary traffic from the MME to the MSC, and thus to prevent the SMS trigger message from being delayed due to the redundant routing through both of the MME and the MSC.

Figure 3:
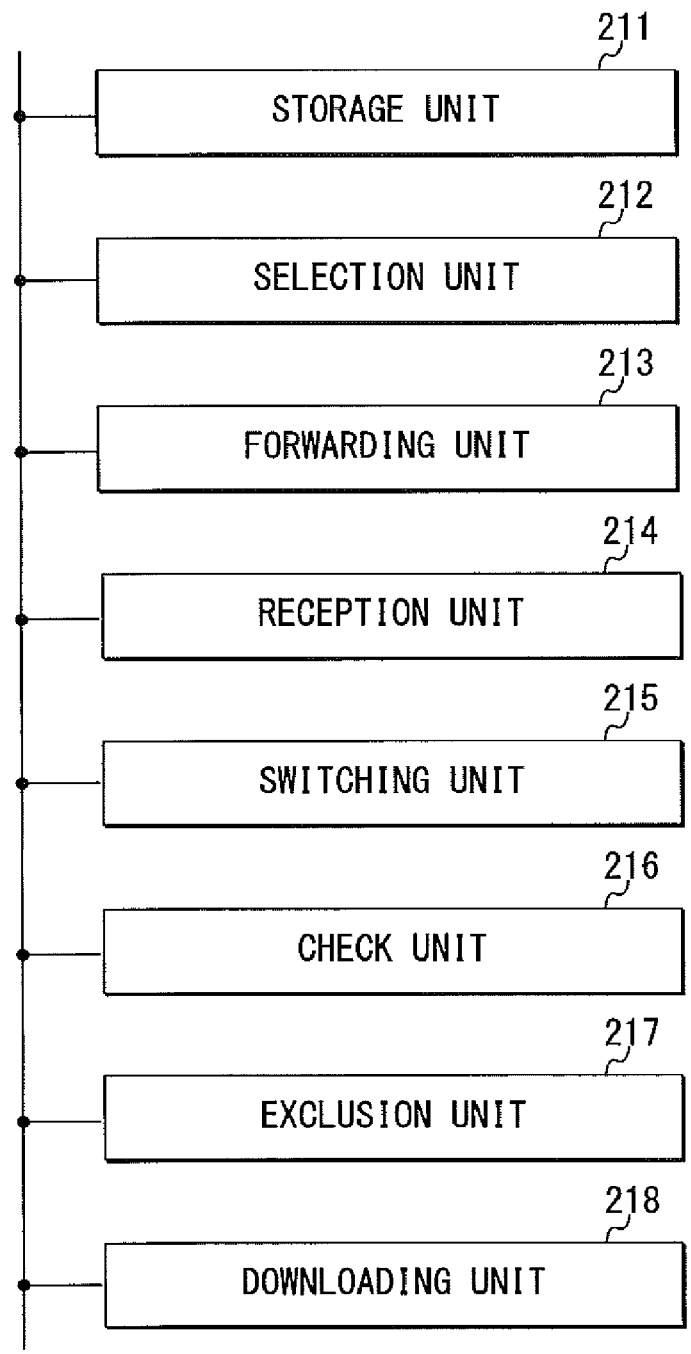
FIG. 3 is a block diagram showing a configuration example of a network node placed within a core network in the system according to the exemplary embodiment of the present invention.

As shown in FIG. 3, the MTC-IWF 21 includes at least a part or all of a storage unit 211, a selection unit 212, a forwarding unit 213, a reception unit 214, a switching unit 215, a check unit 216, an exclusion unit 217, and a downloading unit 218. These units 211 to 218 are mutually connected with each other through a bus or the like. The storage unit 211 stores the priority list. The selection unit 212 selects one of the MME/SGSN/MSC 24 based on the priority list. The forwarding unit 213 forwards the trigger message to the MTC device 10 through the selected one of the MME/SGSN/MSC 24. The reception unit 214 receives the trigger message from the SCS 30 or the SME 40, and receives the Reject message from the MTC device 10 through the selected one of the MME/SGSN/MSC 24. The switching unit 215 causes the forwarding unit 213 to forward the trigger message through a different one of the MME/SGSN/MSC 24, when the Reject message is received by the reception unit 214. The check unit 216 checks whether or not the selected one of the MME/SGSN/MSC 24 can securely forward the trigger message to the MTC device 10. The exclusion unit 217 instructs the forwarding unit 213 to exclude the selected one of the MME/SGSN/MSC 24 upon the subsequent forwarding, when the check unit 216 determines that the selected one of the MME/SGSN/MSC 24 cannot securely forward the trigger message. The downloading unit 218 can download from the HSS 22 the priority list to be stored in the storage unit 211. Further, the downloading unit 218 downloads the MTC device capability from the HSS 22. When the MTC device capability indicates that the MTC device 10 does not support IMS, the forwarding unit 213 forwards the trigger message directly to the MSC.

Figure 2:
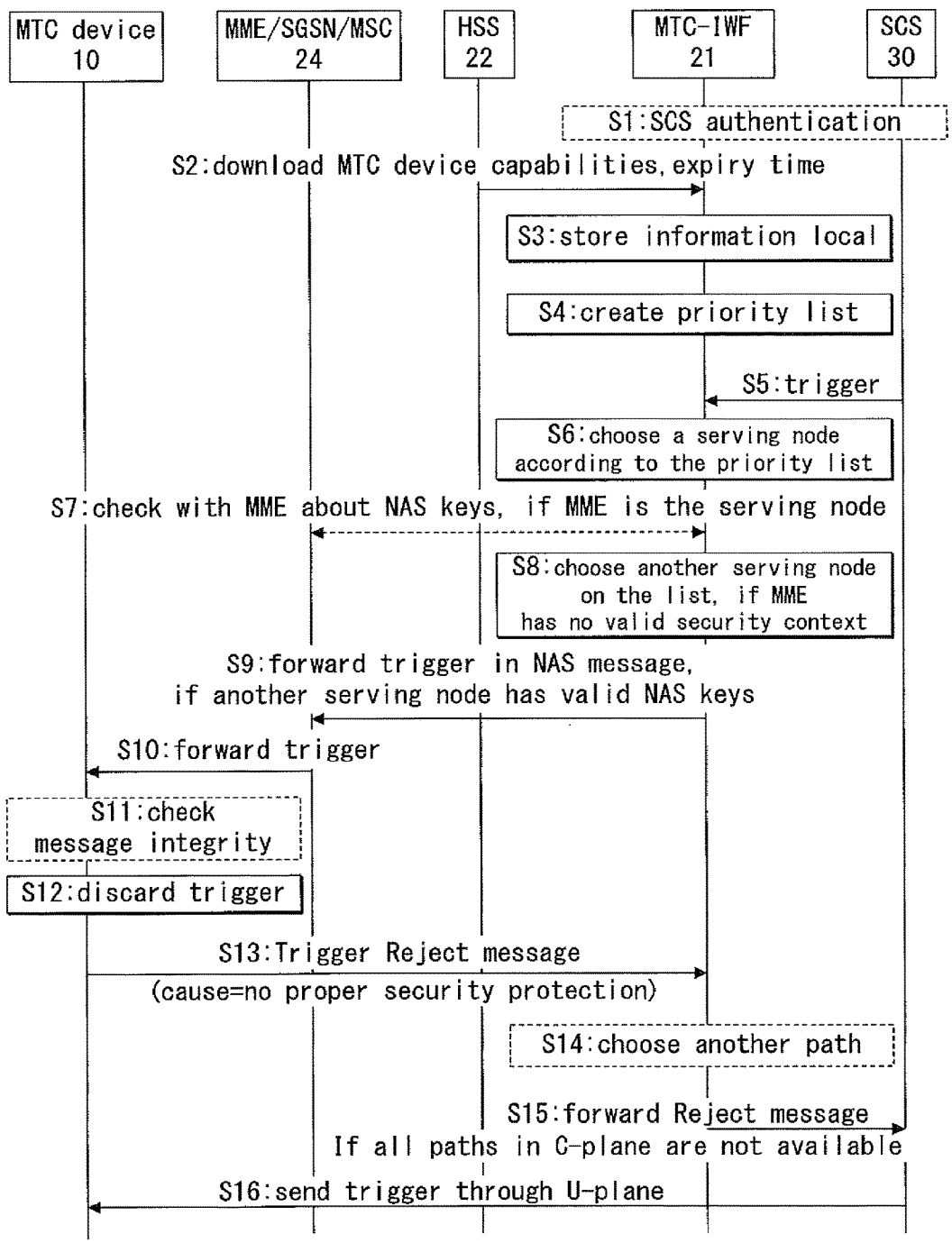
FIG. 2 is a sequence diagram showing an example of message sequence (trigger carried in NAS message) in a system according to the exemplary embodiment of the present invention.

These units 211 to 218 can be configured by, for example, transceivers which respectively conduct communication with the HSS 22, the MME/SGSN/MSC 24, the SCS 30 and the SME 40, and a controller which controls these transceivers to execute the processes shown at Steps S1 to S9 and S13 to S15 in FIG. 2 or processes equivalent thereto. The GGSN/P-GW 23 can be also configured as with the MTC-IWF 21, except conducting communication with the SGSN, the S-GW 25, the SCS 30 and the AS through the user plane.

Figure 4:
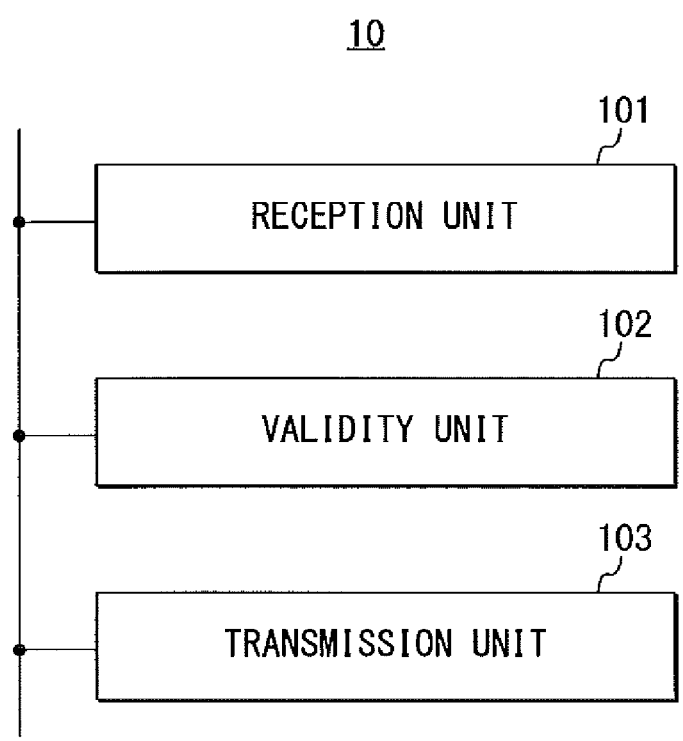
FIG. 4 is a block diagram showing a configuration example of a MTC device in the system according to the exemplary embodiment of the present invention.

Further, as shown in FIG. 4, the MTC device 10 includes at least a reception unit 101, a validity unit 102, and a transmission unit 103. These units 101 to 103 are mutually connected with each other thorough a bus or the like. The reception unit 102 receives the trigger message from the core network. The validity unit 102 validates the trigger message. The transmission unit 103 transmits the Reject message to the core network, when the trigger message is not validated by the validity unit 102. These units 101 to 103 can be configured by, for example, a transceiver which wirelessly conducts communication with the core network through the RAN, and a controller which controls this transceiver to execute the processes shown at Steps S10 to S13 and S16 in FIG. 2 or processes equivalent thereto.

Figure 5:
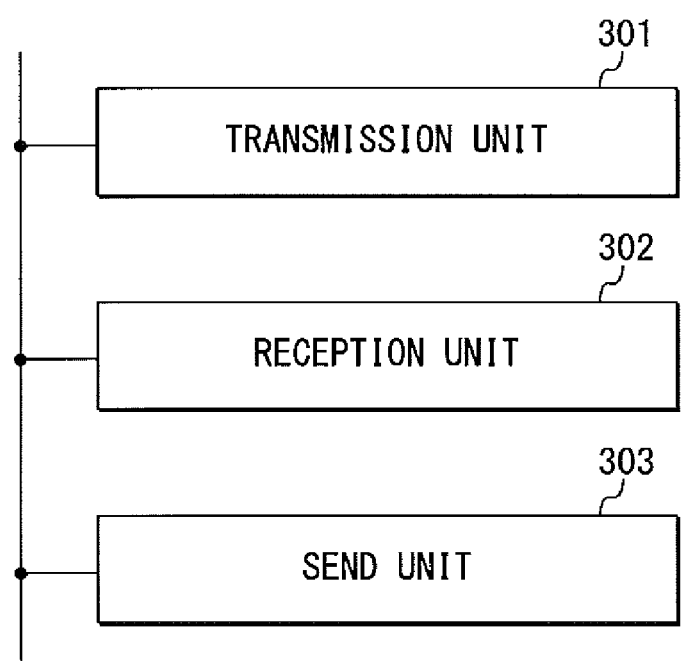
FIG. 5 is a block diagram showing a configuration example of a network node placed outside the core network in the system according to the exemplary embodiment of the present invention.

Furthermore, as shown in FIG. 5, the SCS 30 includes at least a transmission unit 301, a reception unit 302, and a send unit 303. These units 301 to 303 are mutually connected with each other thorough a bus or the like. The transmission unit 301 transmits the trigger message to the core network through control plane (i.e. transmits the trigger message to the MTC-IWF 21 via Tsp interface). The reception unit 302 receives the Reject message from the MTC-IWF 21. The send unit 303 sends the trigger message through user plane (i.e. sends the trigger message to the GGSN/P-GW 23 via Gi/SGi interface), when the Reject message is received by the reception unit 302. These units 301 to 303 can be configured by, for example, transceivers which respectively conduct communication with the MTC-IWF 21 and the GGSN/P-GW 23, and a controller which controls these transceivers to execute the processes shown at Steps S1, S5, S15 and S16 in FIG. 2 or processes equivalent thereto. The SME 40 can be also configured as with the SCS 30, except transmitting the trigger message to the MSC-IWF 21 via the SMS-SC/GMSC/IWMSC.

Note that the present invention is not limited to the above-mentioned exemplary embodiment, and it is obvious that various modifications can be made by those of ordinary skill in the art based on the recitation of the claims.

For example, the MTC-IWF 21 or the GGSN/P-GW 23 may transfer the trigger message through a different network element, when a response to the trigger message is not received within a predetermined period of time. Specifically, the reception unit 214 receives the response from the MTC device 10. If the response is not received by the reception unit 214 within the period of time, the switching unit 215 causes the forwarding unit 213 to forward the trigger message through a network element different from the selected network element. Note that the period of time can be measured by use of a timer, a counter or the like. Thus, it can be also ensured that the trigger message reaches the MTC device 10. In this case, it may not be required for the MTC device 10 to sends the Reject message, so that modification to the MTC device 10 can be reduced compared with the above-mentioned exemplary embodiment.

The whole or part of the exemplary embodiment disclosed above can be described as, but not limited to, the following supplementary notes.

(Supplementary Note 1)

MTC-IWF downloads (requesting or being pushed) MTC device capabilities from HSS via interface S6m including for example if MTC device supports IMS. This can be a new message or a new field in the message which MTC-IWF retrieves MTC device serving node information.

(Supplementary Note 2)

MTC device trigger delivery route priority list. This list is created based on the operator policy of network usage and/or by UE capability. The list can be created in HSS then pushed to MTC-IWF, or created by MTC-IWF after it downloaded the necessary information from HSS. The list can be stored in MTC-IWF locally.

(Supplementary Note 3)

If a MME is the serving node, MTC-IWF checks with MME to see if it has valid NAS security context. When MME does not have valid security context, MTC-TWF should forward the trigger to other entities like SGSN/MSC according to the delivery route priority.

(Supplementary Note 4)

When MTC device receives a trigger embedded in an unprotected NAS or user plane message, it sends a Trigger Reject message with cause indication to network node: MTC-IWF or GGSN/P-GW.

(Supplementary Note 5)

MTC-IWF, which receives a reject message with a cause indicating there was no proper NAS protection, finds another path to deliver the trigger. When all the control plane paths are not available, MTC-IWF can initiate AKA and SMC procedure. It also can forward the Reject message to SCS, such that SCS can send the trigger message via user plane.

(Supplementary Note 6)

GGSN/P-GW which receives a reject message with a cause indicating there was no proper user plane confidentiality protection, finds another path to deliver the trigger.

2. Discussion

There are two issues discussed in this document.

First, SA2 TS 23.682 considers roaming in the architecture. In this case, the visited network may not be trusted by the MTC device and the triggers forwarded from such network should not be trusted and taken as valid either.

Thus MTC device should:

verify if the MTC-IWF it communicates with is authorized.

be able to verify if the trigger is from a authorized MTC-IWF. If it is from an invalid MTC-IWF, MTC device should inform MME such that MME will suspend the communication with MTC-IWF and may have a further action.

Second, when the MTC device receives a trigger without NAS integrity protection, the MTC device (as described in TR 33.868) "could discard the trigger or alternatively look deeper into the trigger if end-to-end protection was applied".

A few things are concerned:

The trigger cannot be received and MTC server or MTC user has no knowledge about the discard.

It wastes network traffic and MTC device's battery, that if MME sends a trigger which will not be received.

In order to solve the above described issue:

MME should not send the trigger without protection in the first place

If such trigger is received, MTC device should send Reject message to MME/MTC-IWF/SCS with a cause of reject such that network can act accordingly:

MME can Initiate AKA procedure to establish security context

MTC-IWF can send the trigger from another path (i.e. via another network node), for example, SGSN. This can depend on operator policy and/or MTC device capabilities.

Based on the discussion above, we propose to have the following change to TR 33.868.

Solution 1: Triggering via NAS signaling

The main Device triggering mechanisms currently being considered in SA2 TR 23.888 [10] are triggering via NAS signalling (e.g. a new information element in an existing NAS message or a new NAS message) and triggering via SMS. The SMS trigger may possibly also be sent from the network to the MTC Device using NAS as a transport. In this case, current NAS security mechanisms can be used to solve the security issue. After NAS SMC, NAS security is activated. All NAS signaling messages should be integrity-protected according to TS 33.401 [13], and therefore current LTE security mechanisms ensure that the trigger indication is not tampered with. In this case the SMS trigger will also benefit from the integrity protection of NAS signalling in LTE.

Source verification needs to be considered which in this context is understood to mean that the MTC Device can verify that the source of the trigger is a valid MTC server. This could be achieved in the following way.

MTC Device trusts the 3GPP network sending the NAS integrity protected trigger. In this case the MTC Device could be configured with identities of trusted 3GPP networks. (Somewhat analogically as trusted non 3GPP access networks can be configured in the UE in TS 33.402.) In this context trusted 3GPP network would mean networks which have a secured interface from the MTC server to the 3GPP network, and which are trusted to ensure that only trigger indications received from authorized MTC Servers will lead to triggering of MTC Devices "belonging" to that MTC server.

The network may not be trusted for example when MTC device is roaming in the visited network, or when there is a strict security requirement for MTC. The MTC device should verify if the trigger is forwarded from a valid MTC-IWF.

When the MTC Device then receives a NAS integrity protected trigger, it can, after verifying NAS integrity protection, verify the 3GPP network in the sense as described above. If both can be verified, the trigger can be accepted.

MME should not send the trigger in a NAS message without integrity protection. If there is no NAS integrity protection of the trigger or if the 3GPP network is not trusted, the MTC Device could discard the trigger and send a Reject message to MME and MTC-IWF with a proper cause or alternatively look deeper into the trigger if end-to-end protection was applied.

When MME receives a reject response from MTC device with a cause indicating no integrity protection or integrity check failure, MME can Initiate 3GPP AKA procedure towards MTC device so that when there is security context shared between them MME can forward the trigger;

Or forward the reject message to MTC-IWF, so that MTC-IWF can choose another route to send the trigger.

This application is based upon and claims the benefit of priority from Japanese patent application No. 2012-147982, filed on Jun. 29, 2012, and Japanese patent application No. 2012-209393, filed on Sep. 24, 2012, the disclosures of which are incorporated herein in their entirety by reference.

REFERENCE SIGNS LIST

10 MTC DEVICE
21 MTC-IWF
22 HSS
23 GGSN/P-GW
24 MME/SGSN/MSC
25 S-GW
30 SCS
40 SME
101, 214, 302 RECEPTION UNIT
102 VALIDITY UNIT
103, 301 TRANSMISSION UNIT
211 STORAGE UNIT
212 SELECTION UNIT
213 FORWARDING UNIT
215 SWITCHING UNIT
216 CHECK UNIT
217 EXCLUSION UNIT
218 DOWNLOADING UNIT
303 SEND UNIT

The invention claimed is:

1. A mobile communication system, comprising:
a SCS (Services Capability Server);
a MTC-IWF (Machine Type Communication-Interworking Function);
a HSS (Home Subscriber Server) or a HLR (Home Location Register);
a serving node that is at least one of a MME (Mobility Management Entity), a SGSN (Serving GPRS Support Node), and a MSC (Mobile Switching Center); and
a UE (User Equipment), wherein
the HSS or the HLR generates route information and serving node information,
the MTC-IWF receives the route information and the serving node information from the HSS or the HLR, prioritizes the serving node based on usage rate of the serving node, and selects the prioritized serving node, and
the SCS delivers a trigger message to the UE via the selected prioritized serving node.

2. The system according to claim 1, wherein if the device trigger delivery fails, a failure message with cause indicating the failure is sent to the MTC-IWF and the MTC-IWF sends the message to the SCS.

3. The system according to claim 1, wherein the MTC-IWF receives the trigger message for SMS (Short Mail Service) from SMS-SC/GMSC/IWMSC (Short Message Service-Switching Center/Gateway Mobile Switching Center/Inter Working Mobile Switching Center).

4. The system according to claim 1, wherein the prioritized serving node based on the route information is re-selected if the trigger message delivery fails.

5. A communication method of a mobile communication system including a SCS (Services Capability Server), a MTC-IWF (Machine Type Communication-Interworking Function), a HSS (Home Subscriber Server) or a HLR (Home Location Register), a UE (User Equipment), and a serving node that is at least one of a MME (Mobility Management Entity), a SGSN (Serving GPRS Support Node), and a MSC (Mobile Switching Center), the communication method comprising:
  generating route information and serving node information;
  receiving the route information and the serving node information from the HSS or the HLR;
  prioritizing the serving node based on usage rate of the serving node; and
  selecting the prioritized serving node; and
  delivering a trigger message to the UE via the selected prioritized serving node.

6. The method according to claim 5, wherein if the device trigger delivery fails, a failure message with cause indicating the failure is sent to the MTC-IWF and the MTC-IWF sends the message to the SCS.

7. The method according to claim 5, wherein the MTC-IWF receives the trigger message for SMS (Short Mail Service) from SMS-SC/GMSC/IWMSC (Short Message Service-Switching Center/Gateway Mobile Switching Center/Inter Working Mobile Switching Center).

8. A UE (User Equipment) in a mobile communication system including a SCS (Services Capability Server), a MTC-IWF (Machine Type Communication-Interworking Function), a HSS (Home Subscriber Server) or a HLR (Home Location Register), and a serving node that is at least one of a MME (Mobility Management Entity), a SGSN (Serving GPRS Support Node), and a MSC (Mobile Switching Center), the UE comprising:
  a receiver configured to receive a trigger message from the SCS; and
  a sender configured to send a response to the MTC-IWF upon reception of the trigger message, wherein
    the MTC-IWF receives route information and serving node information from the HSS or the HLR, prioritizes the serving node based on usage rate of the serving node, and selects the prioritized serving node.

9. The UE according to claim 8, wherein if the device trigger delivery fails, a failure message with cause indicating the failure is sent to the MTC-IWF and the MTC-IWF sends the message to the SCS.

10. The UE according to claim 8, wherein the MTC-IWF receives the trigger message for SMS (Short Mail Service) from SMS-SC/GMSC/IWMSC (Short Message Service-Switching Center/Gateway Mobile Switching Center/Inter Working Mobile Switching Center).

11. A communication method of a UE (User Equipment) in a mobile communication system including a SCS (Services Capability Server), a MTC-IWF (Machine Type Communication-Interworking Function), a HSS (Home Subscriber Server) or a HLR (Home Location Register), and a serving node that is at least one of a MME (Mobility Management Entity), a SGSN (Serving GPRS Support Node), and a MSC (Mobile Switching Center), the communication method comprising:
  receiving a trigger message from the SCS; and
  sending a response to the MTC-IWF upon reception of the trigger message, wherein
    the MTC-IWF receives route information and serving node information from the HSS or the HLR, prioritizes the serving node based on usage rate of the serving node, and selects the prioritized serving node.

12. The method according to claim 11, wherein if the device trigger delivery fails, a failure message with cause indicating the failure is sent to the MTC-IWF and the MTC-IWF sends the message to the SCS.

13. The communication method according to claim 11, wherein the MTC-IWF receives the trigger message for SMS (Short Mail Service) from SMS-SC/GMSC/IWMSC (Short Message Service-Switching Center/Gateway Mobile Switching Center/Inter Working Mobile Switching Center).

14. A MTC-IWF (Machine Type Communication-Interworking Function) in a mobile communication system including a UE (User Equipment), a serving node that is at least one of a MME (Mobility Management Entity), a SGSN (Serving GPRS Support Node), and a MSC (Mobile Switching Center), a HSS (Home Subscriber Server) or a HLR (Home Location Register), and a SCS (Services Capability Server), the MTC-IWF comprising:
  a receiver configured to receive route information and serving node information from the HSS or the HLR; and
  a controller configured to prioritize the serving node based on usage rage of the serving node, and select the prioritized serving node; wherein
    a trigger message from the SCS is delivered to the UE via the selected prioritized serving node.

15. The MTC-IWF according to claim 14, wherein if the device trigger delivery fails, a failure message with cause indicating the failure is sent to the MTC-IWF and the MTC-IWF sends the message to the SCS.

16. The MTC-IWF according to claim 14, wherein the MTC-IWF receives the trigger message for SMS (Short Mail Service) from SMS-SC/GMSC/IWMSC (Short Message Service-Switching Center/Gateway Mobile Switching Center/Inter Working Mobile Switching Center).

17. A communication method of a MTC-IWF (Machine Type Communication-Interworking Function) in a mobile communication system including a UE (User Equipment), a serving node that is at least one of a MME (Mobility Management Entity), a SGSN (Serving GPRS Support Node), and a MSC (Mobile Switching Center), a HSS (Home Subscriber Server) or a HLR (Home Location Register), and a SCS (Services Capability Server), the communication method comprising:
  receiving route information and serving node information from the HSS or the HLR;
  prioritizing the serving node based on usage rate of the serving node; and
  selecting the prioritized serving node, wherein
    a trigger message from the SCS is delivered to the UE via the selected prioritized serving node.

18. The method according to claim 17, wherein if the device trigger delivery fails, a failure message with cause indicating the failure is sent to the MTC-IWF and the MTC-IWF sends the message to the SCS.

19. The method according to claim 17, wherein the MTC-IWF receives the trigger message for SMS (Short Mail Service) from SMS-SC/GMSC/IWMSC (Short Message Service-Switching Center/Gateway Mobile Switching Center/Inter Working Mobile Switching Center).

\* \* \* \* \*